United States Patent
Moore

(10) Patent No.: US 9,902,504 B2
(45) Date of Patent: Feb. 27, 2018

(54) SYSTEMS AND METHODS FOR DOCKING AND CHARGING UNMANNED AERIAL VEHICLES

(71) Applicant: Toyota Motor Engineering & Manufacturing North America, Inc., Erlanger, KY (US)

(72) Inventor: Douglas A. Moore, Livermore, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 205 days.

(21) Appl. No.: 14/613,841

(22) Filed: Feb. 4, 2015

(65) Prior Publication Data
US 2016/0221688 A1 Aug. 4, 2016

(51) Int. Cl.
| | |
|---|---|
| *B64F 1/00* | (2006.01) |
| *B64C 39/02* | (2006.01) |
| *F21V 33/00* | (2006.01) |
| *H01F 38/14* | (2006.01) |
| *H02J 7/00* | (2006.01) |
| *F21K 9/20* | (2016.01) |

(Continued)

(52) U.S. Cl.
CPC .............. *B64F 1/00* (2013.01); *B64C 39/024* (2013.01); *F21K 9/20* (2016.08); *F21V 33/00* (2013.01); *H01F 38/14* (2013.01); *H02J 7/00* (2013.01); *B64C 2201/042* (2013.01); *B64C 2201/066* (2013.01); *F21V 23/0442* (2013.01); *F21W 2131/103* (2013.01); *F21Y 2115/10* (2016.08); *H01R 13/6205* (2013.01); *H01R 33/92* (2013.01)

(58) Field of Classification Search
CPC ...... B64F 3/00; B64F 1/00; B64F 1/22; B64F 1/222; B64C 39/024; B64C 2201/042; G05D 1/0011; G06Q 10/0832; G07C 5/008; G07C 9/00309; G07C 2009/00793; B60R 28/24; F02N 11/0807
See application file for complete search history.

(56) References Cited

U.S. PATENT DOCUMENTS
| | | | |
|---|---|---|---|
| 7,543,780 B1 | 6/2009 | Marshall | |
| 8,442,700 B2 | 5/2013 | Anderson | |

(Continued)

FOREIGN PATENT DOCUMENTS
| | | | | |
|---|---|---|---|---|
| DE | 10032319 A1 | 1/2002 | | |
| DE | 202005010567 U1 | 12/2005 | | |
| DE | 102013004881 A1 * | 9/2014 | ............ | H02J 7/0027 |

OTHER PUBLICATIONS

Samer Aldhaher, Automated Recharging Station for Swarm of Unmanned Aerial Vehicles, ASME International Mechanical Engineering Congress and Exposition, 2012.

(Continued)

*Primary Examiner* — Assres H Woldemaryam
(74) *Attorney, Agent, or Firm* — Dinsmore & Shohl LLP

(57) ABSTRACT

Unmanned aerial vehicle charging systems including unmanned aerial vehicle charging stations having a light socket connector configured to be coupled to a light socket, a power circuit electrically coupled to the light socket connector, and a charging station body having one or more electrical contact regions electrically coupled to the power circuit. The one or more electrical contact regions are electrically engageable with one or more unmanned aerial vehicles.

14 Claims, 6 Drawing Sheets

(51) Int. Cl.
  *F21V 23/04* (2006.01)
  *H01R 13/62* (2006.01)
  *H01R 33/92* (2006.01)
  *F21W 131/103* (2006.01)
  *F21Y 115/10* (2016.01)

(56) References Cited

U.S. PATENT DOCUMENTS

| | | | | |
|---|---|---|---|---|
| 8,511,606 | B1* | 8/2013 | Lutke | B64C 39/028 244/100 R |
| 8,862,288 | B2 | 10/2014 | Vavrina | |
| 9,387,928 | B1* | 7/2016 | Gentry | B64C 39/024 |
| 2003/0066932 | A1 | 4/2003 | Carroll | |
| 2012/0244732 | A1* | 9/2012 | Fullerton | H01R 13/6205 439/236 |
| 2014/0062384 | A1 | 3/2014 | Niizuma | |
| 2014/0217242 | A1 | 8/2014 | Muren | |
| 2015/0097530 | A1* | 4/2015 | Scarlatti | B60L 11/1827 320/109 |
| 2015/0266575 | A1* | 9/2015 | Borko | B64C 39/024 701/3 |
| 2015/0336669 | A1* | 11/2015 | Kantor | G01C 21/20 701/3 |
| 2015/0344136 | A1* | 12/2015 | Dahlstrom | B64C 39/024 701/3 |
| 2016/0001883 | A1* | 1/2016 | Sanz | B64F 1/02 244/17.23 |
| 2016/0039541 | A1* | 2/2016 | Beardsley | B60L 11/1816 701/2 |
| 2016/0144982 | A1* | 5/2016 | Sugumaran | B64C 25/32 244/103 R |
| 2016/0200438 | A1* | 7/2016 | Bokeno | B64D 1/08 244/2 |

OTHER PUBLICATIONS

Extended European Search Report issued corresponding EP Appln. No. 16153925.9, dated Sep. 20, 2016.

* cited by examiner

SYSTEMS AND METHODS FOR DOCKING AND CHARGING UNMANNED AERIAL VEHICLES

TECHNICAL FIELD

The present specification generally relates to unmanned aerial vehicle charging methods and systems and, more particularly, to unmanned aerial vehicle charging stations positioned throughout a facility.

BACKGROUND

Unmanned aerial vehicles may be used to perform a variety of aerial functions in outdoor and indoor environments, such as surveillance and observation. Unmanned aerial vehicles may include autonomous aerial vehicles and remotely piloted aerial vehicles. Further, unmanned aerial vehicles may be electrically powered and may require a charging mechanism to charge the batteries and power systems of the unmanned aerial vehicle.

Accordingly, unmanned aerial vehicle charging stations may be desired to provide a docking and charging location for unmanned aerial vehicles.

SUMMARY

In one embodiment, an unmanned aerial vehicle charging station includes a light socket connector configured to be coupled to a light socket, a power circuit electrically coupled to the light socket connector, and a charging station body having one or more electrical contact regions electrically coupled to the power circuit. The one or more electrical contact regions are electrically engageable with one or more unmanned aerial vehicles.

In another embodiment, an unmanned aerial vehicle charging system includes an unmanned aerial vehicle and an unmanned aerial vehicle charging station. The unmanned aerial vehicle charging station includes a light socket connector electrically coupled to a power circuit, the light socket connector configured to be electrically coupled to a light socket, a communications module configured to wirelessly communicate with the unmanned aerial vehicle, and a charging station body having one or more electrical contact regions electrically coupled to the power circuit. The one or more electrical contact regions are electrically engageable with the unmanned aerial vehicle.

In yet another embodiment, an unmanned aerial vehicle charging system includes an unmanned aerial vehicle charging station having a power circuit, one or more electrical contact regions, one or more detection sensors, and one or more actuatable magnetic engaging portions. The one or more electrical contact regions are electrically coupled to the power circuit. The one or more electrical contact regions are configured to provide conductive charging, inductive charging, or both to one or more unmanned aerial vehicles. The one or more actuatable magnetic engaging portions are configured to produce a magnetic field and the one or more detection sensors are communicatively coupled to the one or more actuatable magnetic engaging portions such that when the one or more detection sensors detect one or more unmanned aerial vehicles within a threshold distance from the unmanned aerial vehicle charging station, the one or more actuatable magnetic engaging portions produce the magnetic field.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to unmanned aerial vehicle (UAV) charging systems including UAV charging stations positioned throughout a facility and arranged to electrically charge a UAV. The UAV charging stations may include a light socket connector configured to electrically and physically engage a light socket positioned within the facility. This allows the light socket to provide electricity to the UAV charging station. The UAV charging station further includes one or more electrical contact regions electrically coupled to the light socket connector and electrically engagable with the UAV. When the UAV is electrically coupled to the electrical contact regions, the UAV charging station may conductively and/or inductively charge the UAV. By electrically engaging a light socket, the UAV charging station utilizes the light sockets already positioned throughout the facility to provide a charging and docking location for the UAV in an unobstructive location of the facility, such as a wall or ceiling.

Figure 1:
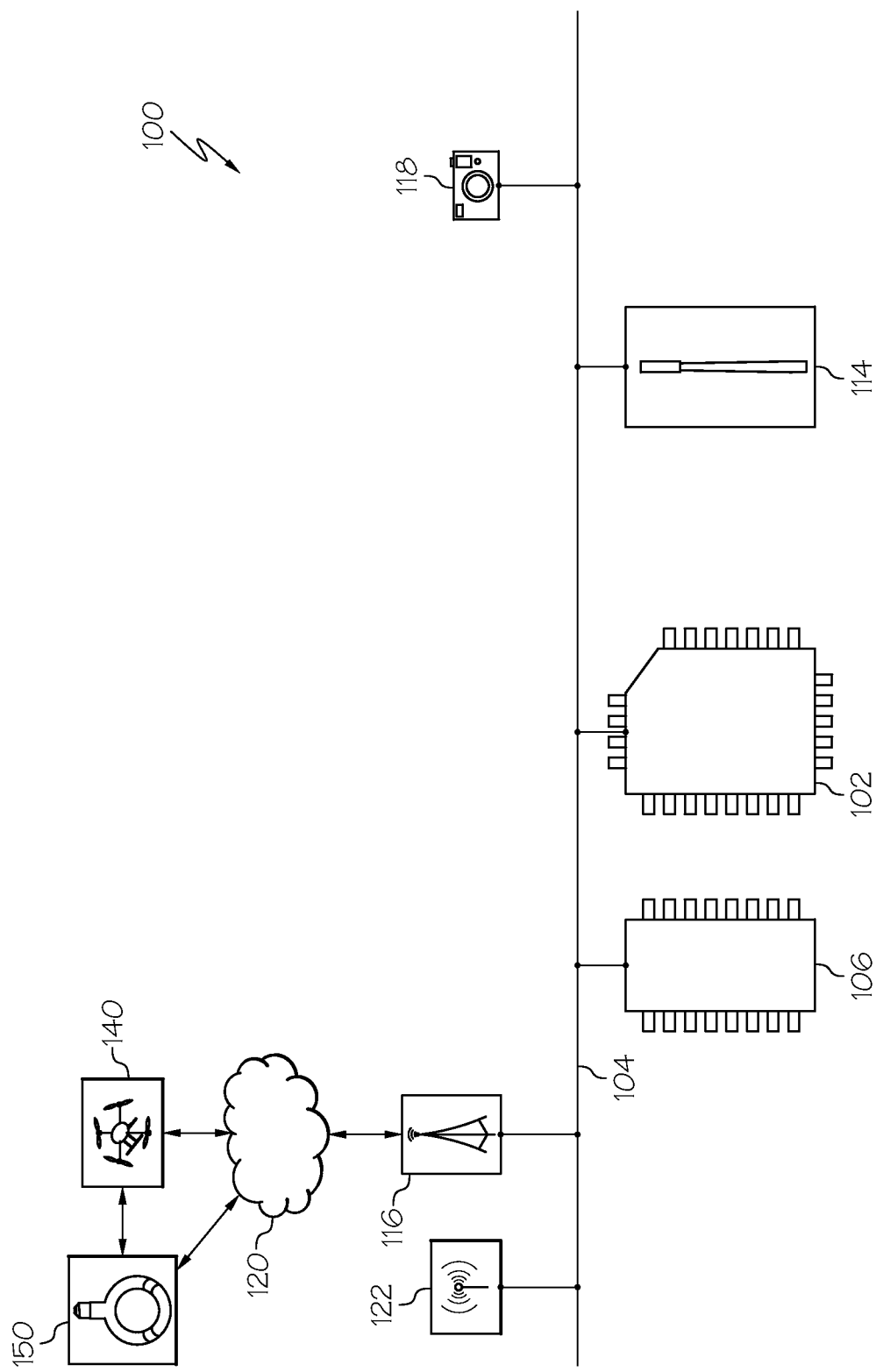
FIG. 1 schematically depicts an unmanned aerial vehicle charging system, according to one or more embodiments shown and described herein.
Figure 2:
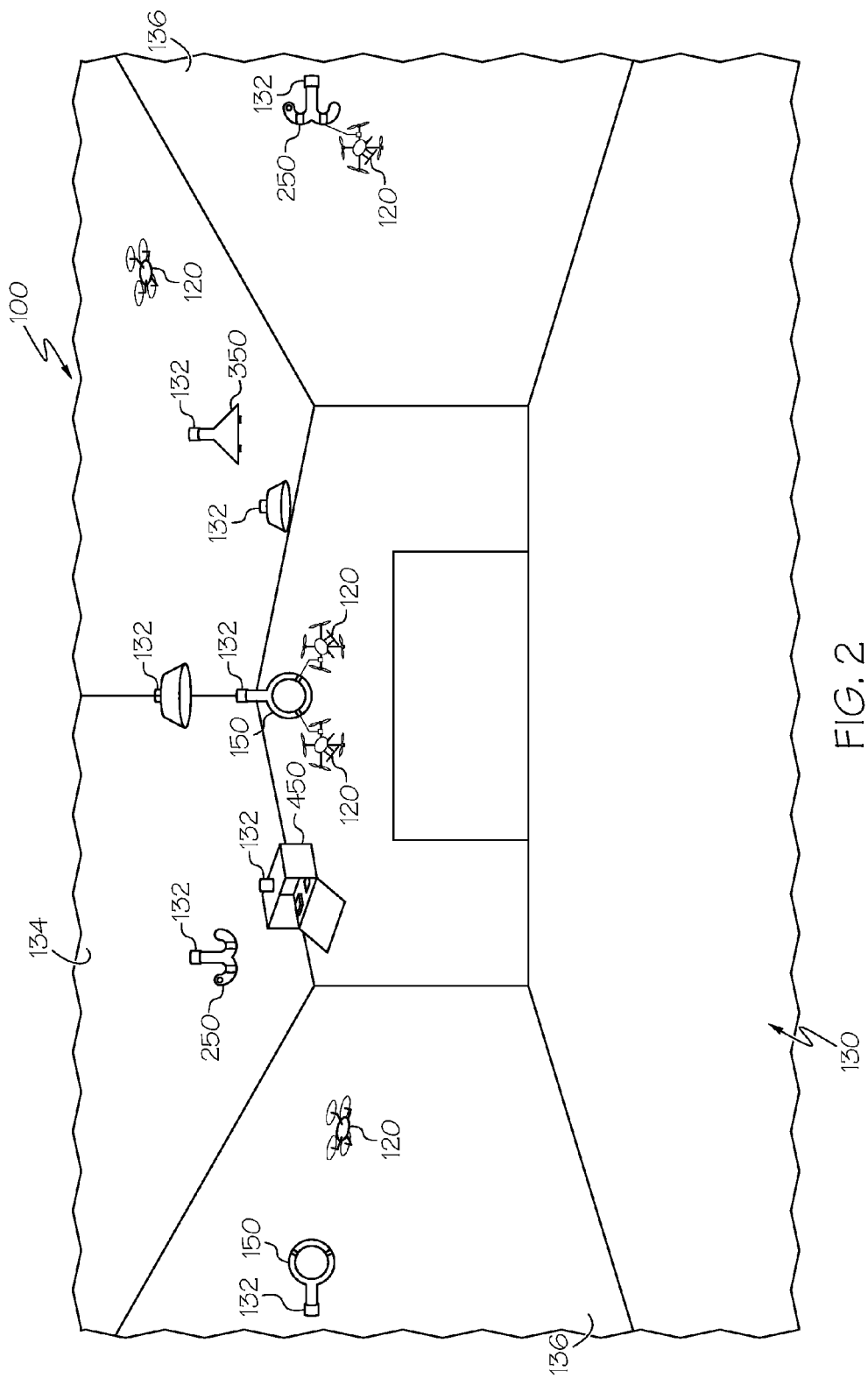
FIG. 2 schematically depicts an unmanned aerial vehicle charging system including one or more unmanned aerial vehicles and unmanned aerial vehicle charging stations positioned within a facility, according to one or more embodiments shown and described herein.

Referring now to FIG. 1, an example embodiment of a UAV charging system 100 is schematically depicted. It is noted that, while the UAV charging system 100 is depicted in isolation, the UAV charging system 100 may be positioned partially or fully within a UAV 140 and/or a UAV charging station 150, for example the UAV charging station 250 (FIGS. 2 and 4), the UAV charging station 350 (FIGS. 2 and 5), and the UAV charging station 450 (FIGS. 2 and 6). Further, it should be understood that any reference to the UAV charging station 150 may apply to any of the embodiments of the UAV charging station (150, 250, 350, 450) described herein.

Referring still to FIG. 1, the UAV charging system 100 may include one or more processors 102. The processors 102 are positioned within the one or more UAV charging stations 150, the UAVs 140, and/or a separate location, such as, for example, within a separate computing device. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various components of the UAV charging system 100. Accordingly, the communication path 104 may communicatively couple any number of processors 102 with one another, and allow the components coupled to the communication path 104 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The UAV charging system 100 may include one or more memory modules 106 coupled to the communication path 104. The memory modules 106 are positioned within the one or more UAV charging stations 150, the UAVs 140, and/or a separate location, such as, for example, within a separate computing device. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. The machine readable instructions may comprise charging logic for providing instruction for the various charging functions of the UAV charging system 100. Accordingly, the methods described herein may be implemented in any conventional computer programming language, as pre-programmed hardware elements, or as a combination of hardware and software components.

The UAV charging system 100 may include a satellite antenna 114 coupled to the communication path 104 such that the communication path 104 communicatively couples the satellite antenna 114 to the UAV charging system 100 including the UAV 140 and/or the UAV charging station 150. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the UAV charging system 100 does not include the satellite antenna 114.

Still referring to FIG. 1, in some embodiments, the UAV charging system 100 may be communicatively coupled to a network 120. In one embodiment, the network 120 is a personal area network that utilizes Bluetooth to communicatively couple the UAV charging system 100 including the UAV 140 and/or the UAV charging station 150. In other embodiments, the network 120 may include one or more computer networks (e.g., a personal area network, a local area network, or a wide area network), cellular networks, satellite networks and/or a global positioning system and combinations thereof. Accordingly, the UAV charging system 100 can be communicatively coupled to the network 120 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, the UAV charging system 100 may comprise network interface hardware 116 for communicatively coupling the UAV charging system 100 to the UAV 140 and/or the UAV charging station 150. The network interface hardware 116 may be positioned within the one or more UAV charging stations 150, the UAVs 140, and/or a separate location. The network interface hardware 116 can be communicatively coupled to the communication path 104 and can be any device capable of transmitting and/or receiving data via a network 120. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from the UAV 140 and/or the UAV charging station 150, for example, between the UAV 140 and the UAV charging station 150. Some embodiments may not include the network interface hardware 116.

It should be understood that the UAV 140 and the UAV charging station 150 are configured with wired and/or wireless communication functionality for communicating with each other and any additional components of the UAV charging system 100. For example, the UAV 140 and the UAV charging station 150 may each include a communications module, for example, a UAV communications module 148 and a UAV charging station communications module 172 (FIGS. 3 and 4) for sending and/or receiving any wired or wireless communication using any of the methods described herein.

Still referring to FIG. 1, the UAV charging system 100 may further comprise one or more detection sensors including one or more cameras 118, one or more proximity sensors 122, or the like. For example, a camera 118 may be coupled to the communication path 104 such that the communication path 104 communicatively couples the camera 118 to other components of the UAV charging system 100. The camera 118 may be any device having an array of sensing devices (e.g., pixels) capable of detecting radiation in an ultraviolet wavelength band, a visible light wavelength band, or an infrared wavelength band. The camera 118 may have any resolution. Some embodiments may not include the camera 118. Some embodiments may include multiple cameras 118. In operation, the camera 118 may be able to detect the presence of the UAV 140. Further, the camera 118 may be able to determine a distance between the UAV 140 and the UAV charging station 150. In some embodiments, the camera 118 may be mounted on the UAV 140, the UAV charging station 150, or both. In some embodiments, the camera 118 may be positioned at another location within and/or proximate the facility 130.

Still referring to FIG. 1, the one or more detection sensors may include one or more proximity sensors 122 coupled to the communication path 104 such that the communication path 104 communicatively couples the proximity sensor 122 to other components of the UAV charging system 100. The proximity sensor 122 may be any device capable of outputting a proximity signal indicative of a proximity of an object to the proximity sensor 122. In some embodiments, the proximity sensor 122 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor 122. In some embodiments, the UAV charging system 100 may be configured to determine the presence of the UAV 140. Further, the proximity sensor 122 may be able to determine the distance between the UAV 140 and the UAV charging station 150. In some embodiments, the proximity sensor 122 may be mounted on the UAV 140, the UAV charging station 150, or both. In some embodiments, the proximity sensor 122 may be positioned at another location within and/or proximate the facility 130.

Referring now to FIG. 2, the UAV charging system 100 including one or more UAV charging stations 150 (FIG. 3), 250 (FIG. 4), 350 (FIG. 5), and 450 (FIG. 6) positioned within a facility 130 is depicted. The facility 130 may be any facility capable of housing one or more UAVs 140, such as a house, office building, warehouse, factory, outdoor facility, or the like. The facility 130 includes one or more light sockets 132 disposed on a ceiling 134 and/or one or more walls 136 of the facility 130. In some embodiments, when the facility 130 is an outdoor facility, the light sockets 132 are outdoor light sockets 132, such as, for example, light sockets 132 positioned within street lamps, patio lights, or the like. The light sockets 132 may comprise any exemplary light socket 132, such as, for example an incandescent light socket, a halogen light socket, a florescent light socket, or the like. The UAV charging stations 150, 250, 350, 450 may be physically and electrically coupled to the light sockets 132 positioned within the facility 130 to provide a charging location and a docking location for one or more UAVs 140.

Figure 3:
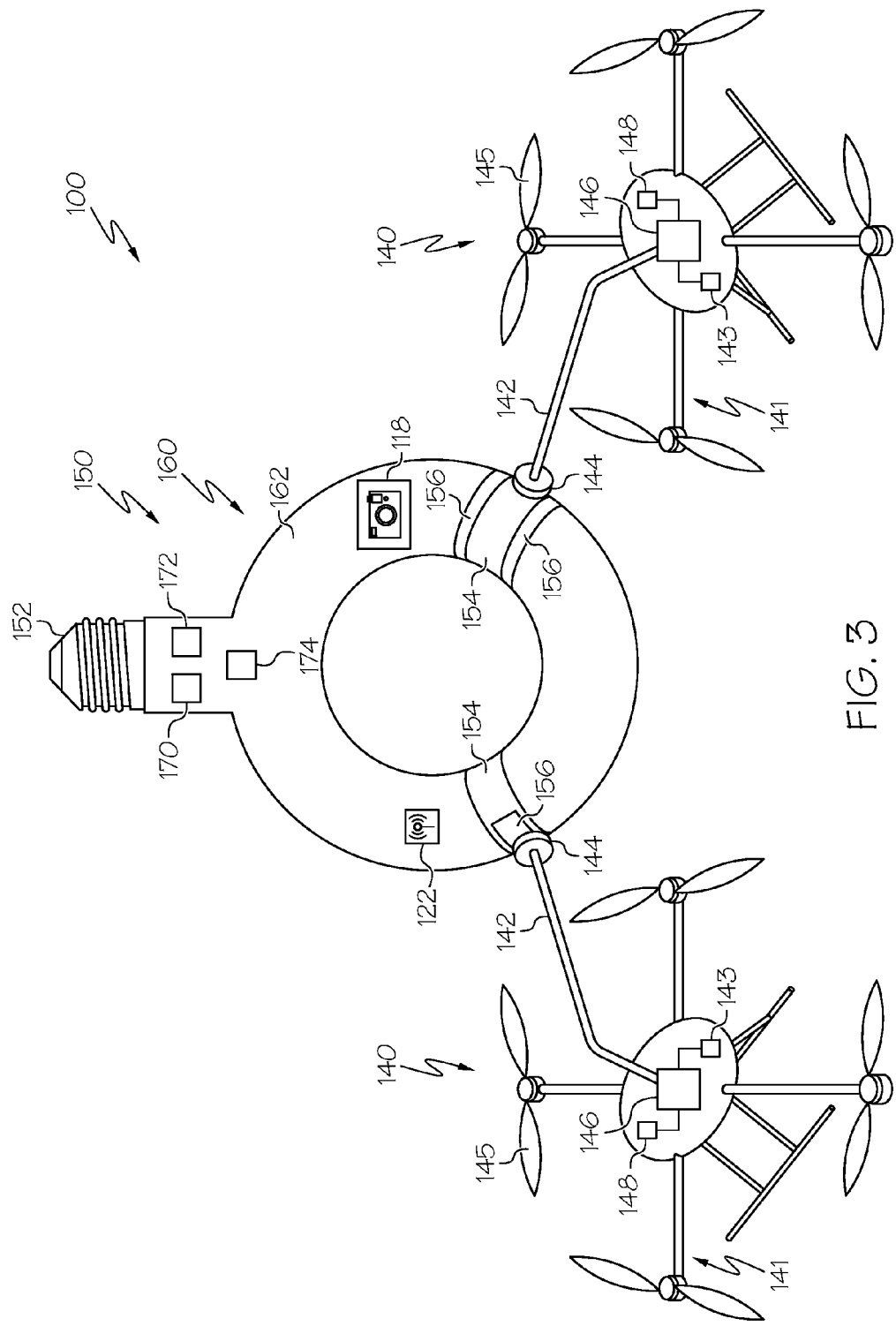
FIG. 3 schematically depicts an unmanned aerial vehicle charging station including an annular portion according to one or more embodiments described herein.
Figure 4:
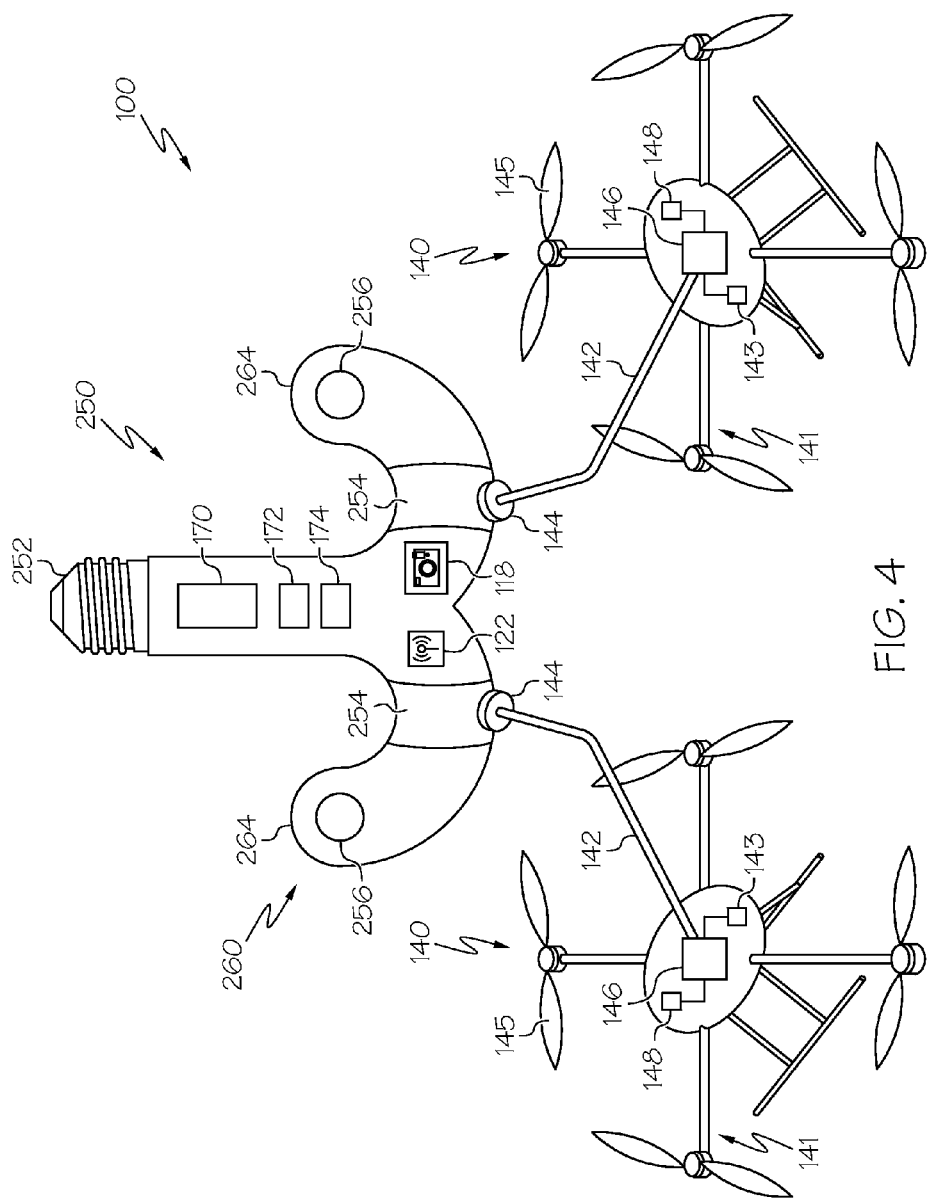
FIG. 4 schematically depicts another embodiment of the unmanned aerial vehicle charging station including mounting hooks according to one or more embodiments described herein.

Referring also to FIGS. 3 and 4, multiple UAVs 140 are depicted proximate the UAV charging stations 150. The UAV 140 may be any exemplary aerial vehicle and may comprise a wing system 141, a drive system 143, the UAV communications module 148, and one or more propellers 145 or other flight mechanisms. The drive system 143 may also include a drive motor coupled to the one or more propellers 145. Further, the UAV 140 comprises a charging system 146 comprising one or more electrically chargeable batteries configured to provide electricity to the one or more systems and components of the UAV 140, for example, the drive system 143 and the UAV communications module 148. It should be understood that the UAV 140 may take on any configuration, and that the UAVs 140 described and illustrated herein are for illustrative purposes only. The UAV communications module 148 provides the UAV 140 with communications capabilities, such as WiFi, Bluetooth, or the like, as described above, to communicatively couple the UAV 140 with the UAV charging stations 150 and the other components of the UAV charging system 100. For example, the UAV 140 may produce a signal receivable by the UAV charging station 150. The signal may include one or more statuses of the UAV 140 indicating the presence of the UAV 140, the proximity of the UAV 140 to the UAV charging station 150, and/or other information regarding the UAV 140, such as, for example, the charge level of the one or more electrically chargeable batteries of the charging system 146.

Referring still to FIGS. 3 and 4, the UAV 140 may be configured to electrically and physically engage the UAV charging station 150 such that the UAV 140 may dock and/or charge at the UAV charging station 150. For example, the UAV 140 may comprise one or more coupling arms 142 each comprising one or more end effectors 144. The end effectors 144 may be configured to engage the UAV charging station 150 using any exemplary mounting mechanism, such as graspers, magnets, hooks, harnesses, or the like. In some embodiments, the end effectors 144 are electrically engageable with the UAV charging station 150. For example, the end effectors 144 may comprise electrical contact points, electrical contact plates, electric plugs, (e.g., a USB plug), electrical prongs, electrical couplings, or the like, configured to electrically engage the electrical contact regions 154 of the UAV charging station 150. Additionally, the coupling arms 142 may include an electrical pathway, such as copper wire or the like, extending from the charging system 146, through the coupling arms 142, and terminating at the end effector 144. This electrical pathway allows the charging system 146 of the UAV 140 to be electrically coupled to the UAV charging station 150. In other embodiments, the UAV 140 may physically engage the UAV charging station using the end effector 144 and may electrically engage the UAV charging station 150 using a separate component. Further, in some embodiments, the UAV 140 may not include the coupling arms 142 or the end effectors 144 and may electrically and physically engage the UAV charging station 150 using any components and mechanisms. It should be understood that any exemplary UAV 140 may be utilized in the UAV charging system 100 described herein.

Referring now to FIG. 3, an example UAV charging station 150 is depicted. The example UAV charging station 150 includes a light socket connector 152 comprising a threaded base, cap, or the like, configured to physically and electrically engage the light socket 132, such as, for example, an Edison screw base, a bayonet mount, a bi-post, or the like. The UAV charging station 150 also includes a power circuit 170 electrically coupled to the light socket connector 152, which may operate as a power source for the power circuit 170. The power circuit 170 is also electrically coupled to one or more electrical contact regions 154 of the UAV charging station 150. The power circuit 170 may be configured as an inverter and/or a converter circuit electrically coupled to the one or more electrical contact regions 154 to provide an electrical power source to one or more UAVs 140 electrically coupled to the one or more electrical contact regions 154. Additionally, the power circuit 170 may be electrically coupled to one or more electrically powered components of the UAV charging station 150, such as, for example, lights 174, cameras 118, proximity sensors 122, magnetic engaging portions 156, UAV charging station communications modules 172, and the like. In some embodiments, the UAV charging station 150 may be coupled to an alternative power source, for example, a wall mounted electrical plug, or the like, in addition to or instead of being electrically coupled to the light socket 132, for example, in embodiments that do not include the light socket connector 152.

Referring still to FIG. 3, the UAV charging station 150 includes a UAV charging station body 160 extending from the light socket connector 152. The UAV charging station body 160 may include an annular portion 162 comprising any annular shape, for example, a circular ring, an oval ring, or the like. The annular portion 162 includes the one or more electrical contact regions 154 positioned on and/or within the annular portion 162, for example, wrapped fully or partially around the ring of the annular portion 162 and/or embedded within the annular portion 162. The electrical contact regions 154 may comprise electrical contact plates, electrical plugs, (e.g., a USB plug), electrical prongs, electrical couplings, or the like. The electrical contact regions 154 may also comprise a positive charge path and a negative charge path. In some embodiments, an individual electrical contact region 154 may be integrated such that the positive charge path and the negative charge path are positioned within the individual electrical contact region 154. In other embodiments, the electrical contact regions 154 may each include an individual charge path. For example, the one or more electrical contact regions 154 may include an individual positive electrical contact region comprising the positive charge path and an individual negative electrical contact region comprising the negative charge path. Additionally, in some embodiments, the one or more electrical contact regions 154 may comprise a wired communications path.

The electrical contact regions 154 may be configured to electrically engage the UAV 140 and charge the UAV 140 using conductive charging and/or inductive charging. For example, the end effectors 144 of the UAV 140 may electrically engage the electrical contact regions 154. When the UAV 140 is electrically coupled to the UAV charging station 150, the electrical contact regions 154 provide an electrical pathway between the light socket 132 and the UAV 140. Further, the UAV 140 may mechanically engage the electrical contact regions 154 for example, the end effectors 144 may latch, grasp, hook, fasten, or the like, to one or more electrical contact regions 154. For example, an individual end effector 144 may be configured to receive a negative charge and may grasp a negative electrical contact region 154 and another individual end effector 144 may be configured to receive a positive charge and may grasp a positive electrical contact region 154. While FIG. 3 depicts coupling arms 142 and end effectors 144 in contact with the electrical contact regions 154, it should be understood that the electrical contact regions 154 may provide inductive charging to the UAV 140 without physical contact between the UAV 140 and the electrical contact regions 154. Further, the electrical contact regions 154 may be configured to electrically engage any component of the UAV 140 configured to receive an electrical charge.

Referring still to FIG. 3, the UAV charging station body 160 may further comprise one or more magnetic engaging portions 156 comprising one or more magnets positioned on or embedded within the UAV charging station body 160. The magnetic engaging portions 156 are magnetically engageable with the UAV 140, for example with the end effectors 144, the coupling arms 142, and/or any portion of the UAV 140. In some embodiments, the magnetic engaging portions 156 are actuatable, for example, the magnetic engaging portions 156 may engage and disengage based on a received signal, for example, a signal provided by the UAV 140 and/or the UAV charging station 150. In some embodiments, the magnetic engaging portions 156 may be positioned within the electrical contact regions 154 or positioned proximate the electrical contact regions 154 to allow the UAV 140 to be simultaneously coupled to the electrical contact regions 154 and the magnetic engaging portions 156. In other embodiments, the magnetic engaging portions 156 are positioned separate from the electrical contact regions 154.

Referring still to FIG. 3, the UAV charging system 100 may comprise one or more detection sensors communicatively coupled to the UAV charging station 150. As described above, the detection sensors may comprise one or more proximity sensors 122, cameras 118, or the like. In some embodiments, the detection sensors may be configured to detect the presence and proximity of one or more UAVs 140 and may be communicatively coupled to the electrical contact regions 154, the magnetic engaging portions 156, and other components of the UAV charging system 100. In operation, when the detection sensors detect the UAV 140 within a threshold distance from the UAV charging station 150, the detection sensors may provide a signal to the UAV charging station 150, causing the UAV charging station 150 to perform one or more functions. For example, when the UAV 140 is within a threshold distance from the UAV charging station 150, the one or more electrical contact regions may produce an inductive charge. Additionally, when the UAV 140 is within the threshold distance from the UAV charging station 150, the one or more magnetic engaging portions 156 may produce a magnetic field to magnetically attract and engage a component of the UAV 140, for example, the coupling arm 142, the end effector 144, or the like.

The threshold distance may comprise any distance, for example, 0.1 m, 0.5 m, 1 m, 2 m, 5 m, or the like. In some embodiments, the threshold distance may programmed into the UAV charging system 100, for example, into the memory modules 106. In some embodiments, the threshold distance is adjustable, for example, based on size and functionality of the UAV 140. Additionally, the threshold distance may depend on the particular function of the UAV charging system 100. For example, the UAV charging system 100 may include a threshold distance for inductive charging, a threshold distance for actuating one or more magnetic engaging portions 156, and a threshold distance for actuating an actuatable door 469 (FIG. 6). Additionally, different threshold distances may be associated with different types of UAVs 140. Further, as previously described, the presence and proximity of the UAV 140 may be determined based on signals produced by the UAV 140 and received by the UAV charging station 150.

Referring still to FIG. 3, the UAV charging station 150 may also provide a docking location for the one or more UAVs 140 while the UAV 140 is charging and while the UAV 140 is not charging. In some embodiments, when the UAV 140 is docked at the UAV charging station 150, the UAV 140 may perform some UAV functions, for example, the UAV 140 may observe the facility 130. In some embodiments, the UAV charging station 150 provides a home base for the UAV 140 such that the UAV 140 remains docked at the UAV charging station 150 until a triggering event occurs within the facility 130, such as movement, noise, or the like. In some embodiments, the triggering event may be sensed by one or more of the detection sensors of the UAV charging system 100, for example, the camera 118 and/or the proximity sensor 122. In other embodiments, the triggering event may be detected by one or more additional sensors communicatively coupled to the UAV charging system 100, for example, one or more sensors of a home security system, a telepresence system, or the like. Additionally, the UAV charging station 150 may include one or more lights 174, for example, incandescent lights, halogen lights, florescent lights, light emitting diodes (LEDs), compact florescent lights (CFLs), or the like. The lights 174 provide the facility 130 with a light source proximate the light socket 132, even when the UAV charging station 150 is coupled to the light socket 132.

Referring now to FIG. 4, another embodiment of the UAV charging system 100 including a UAV charging station 250 is depicted. The UAV charging station 250 comprises a light socket connector 252 which may comprise any of the light socket connectors 152 previously described, as well as the power circuit 170, the UAV charging station communications module 172, the camera 118, the proximity sensor 122, and one or more lights 174, as previously described with respect to the UAV charging station 150. The UAV charging station 250 includes a UAV charging station body 260 having one or more mounting hooks 264. The mounting hooks 264 may include electrical contact regions 254 electrically engagable with the UAV 140 to provide an electrical pathway between the UAV charging station 250 and the UAV 140. In some embodiments, the UAV 140 is engageable with the mounting hooks 264, for example, the end effectors 144 or other components of the UAV 140 may engage an individual mounting hook 264 by latching, grasping, hooking, fastening or the like.

Referring still to FIG. 4, the mounting hooks 264 may also include one or more magnetic engaging portions 256. In some embodiments, the electrical contact regions 254 and the magnetic engaging portions 256 are co-located and, in other embodiments, the electrical contact regions 254 and the magnetic engaging portions 256 are separately positioned. For example, an individual mounting hook 264 may include an electric contact region 254 and another individual mounting hook 264 may include a magnetic contact portion 256. In this embodiment, each mounting hook 264 may be dedicated to magnetic engagement or electrical charging.

Figure 5:
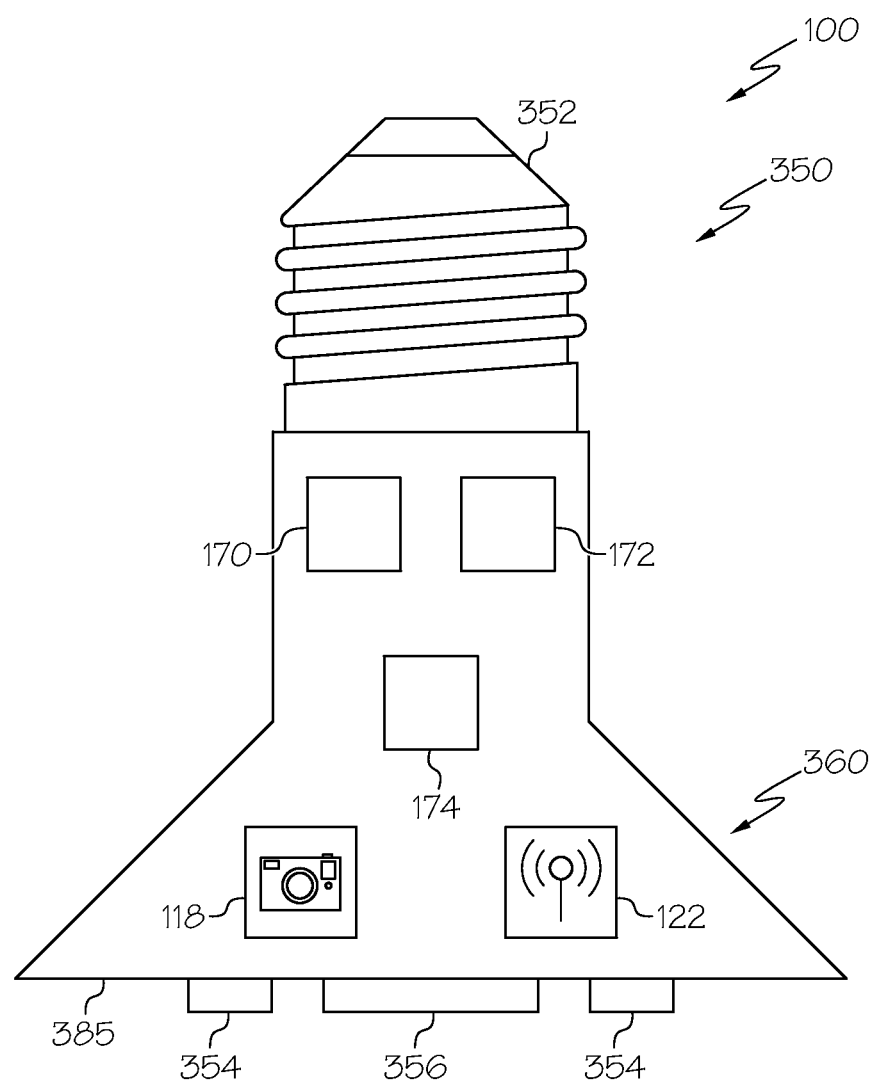
FIG. 5 schematically depicts another embodiment of the unmanned aerial vehicle charging station including an engagement surface according to one or more embodiments described herein.
Figure 6:
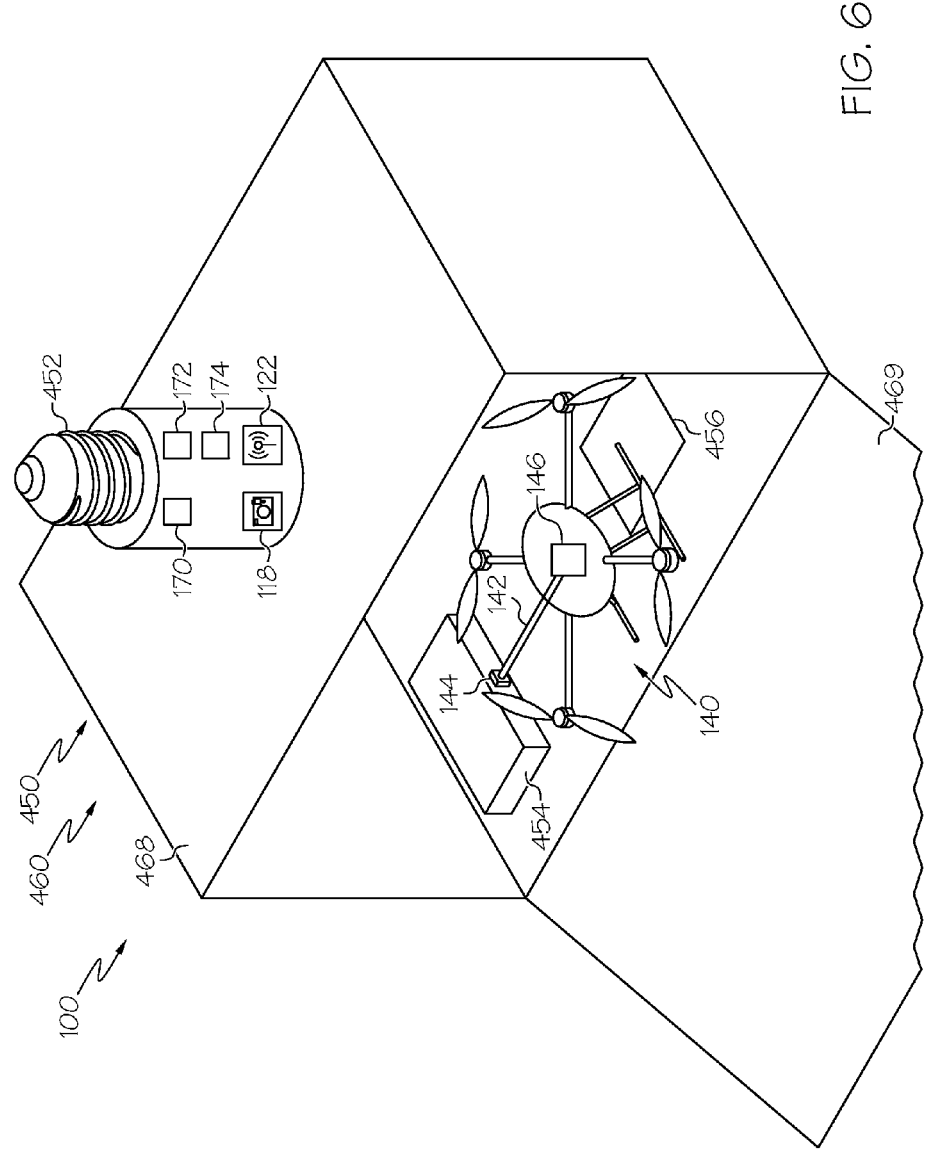
FIG. 6 schematically depicts another embodiment of the unmanned aerial vehicle charging station including a unmanned aerial vehicle garage according to one or more embodiments described herein.

Referring now to FIG. 5, another embodiment of the UAV charging system 100 including a UAV charging station 350 is depicted. The UAV charging station 350 comprises a light socket connector 352 which may comprise any of the light socket connectors 152 previously described, as well as the power circuit 170, the UAV charging station communications module 172, the camera 118, the proximity sensor 122, and one or more lights 174, as previously described with respect to the UAV charging station 150. Further, the UAV charging station 350 comprises a UAV charging station body 360 having an engagement surface 385. The engagement surface 385 may include one or more magnetic engaging portions 356 and one or more electrical contact regions 354 that are co-located, adjacent, proximate, or the like. In some embodiments, the magnetic engaging portions 356 may span the entire engagement surface 385 and the electrical contact regions 354 may be disposed within the magnetic engaging portions 356.

Referring still to FIG. 5, the engagement surface 385 may be positioned on an underside of the UAV charging station body 360, opposite the light socket connector 352. Alternatively, the engagement surface 385 may be any surface of the UAV charging station 350, for example, one or more side surfaces. Further, the UAV charging station body 360 may include multiple engagement surfaces 385. In operation, the engagement surface 385 may magnetically engage one or more UAVs 140 using the magnetic engaging portions 356 to provide the UAV 140 with a docking location. Further, when the UAV 140 is magnetically engaged with the engagement surface 385, the UAV 140 may simultaneously be electrically engaged with the one or more electrical contact regions 354. In alternative embodiments, the engagement surface 285 may engage one or more UAVs 140 using other methods, such as fasteners, latches, and the like.

Referring now to FIG. 6, another embodiment of the UAV charging system 100 including a UAV charging station 450 is depicted. The UAV charging station 450 comprises a light socket connector 452 which may comprise any of the light socket connectors 152 previously described, as well as the power circuit 170, the UAV charging station communications module 172, the camera 118, the proximity sensor 122, and one or more lights 174, as previously described with respect to the UAV charging station 150. The light socket connector 452 may extend from a UAV charging station body 460 comprising a UAV garage 468 configured to enclose one or more UAVs 140. The UAV garage 468 includes one or more walls, a floor, and a ceiling for enclosing one or more UAVs 140. The UAV garage 468 may include one or more electrical contact regions 454 configured to electrically engage the UAV 140 when the UAV 140 is positioned within the UAV garage 468. The UAV garage 468 may also include one or more magnetic engaging portions 456 configured to magnetically engage the UAV 140 when the UAV 140 is positioned within the UAV garage 468.

Referring still to FIG. 6, the UAV garage 468 may also includes an actuatable door 469 actuatable between an open position and a closed position. When the actuatable door 469 is in the open position, one are more UAVs 140 may enter and exit the UAV garage 468. When the actuatable door 469 is in the closed position, one or more UAVs 140 may be held within the UAV garage 468. As stated above, the UAV charging station 450 may include one or more detection sensors configured to detect the presence and proximity of one or more UAVs 140. The detection sensors may be communicatively coupled to the various components of the UAV charging station 450, for example, the actuatable door 469. In some embodiments, when the detection sensors detect that the UAV 140 is within a threshold distance from the actuatable door 469, the actuatable door 469 may be placed in the open position. As another example, when the detection sensors detect that the UAV 140 is positioned within the UAV garage 468, the actuatable door 469 may be placed in the closed position. Additionally, it should be understood that the UAV charging station 450 may determine the presence and the proximity of the UAV 140 using any of the methods described herein, for example, based on signals sent by the UAV 140.

It should now be understood that UAV charging systems including UAV charging stations positioned throughout a facility and arranged to electrically charge a UAV are contemplated. The UAV charging stations may include a light socket connector configured to electrically and physically engage a light socket positioned within the facility. The UAV charging station further includes one or more electrical contact regions electrically coupled to the light socket connector and electrically engagable with the UAV. When the UAV is electrically coupled to the electrical contact regions, the UAV charging station may conductively and/or inductively charge the UAV. Further, the UAV charging station may include one or more magnetic engaging portions configured to magnetically engage the UAV, one or more detection sensors configured to detect the presence and proximity of the UAV, and a communications module configured to communicate with the UAV. The UAV charging stations may also have a variety of sizes and configurations, and may include annular portions, mounting hooks, engagement surfaces, and UAV garages. By electrically engaging a light socket, the UAV charging station utilizes the light sockets already positioned throughout the facility to provide a charging and docking location for the UAV in an unobstructive location of the facility.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An unmanned aerial vehicle charging station comprising:
   a light socket connector configured to be coupled to a light socket;
   a power circuit electrically coupled to the light socket connector;
   one or more detection sensors configured to detect one or more unmanned aerial vehicles and to provide a signal to the unmanned aerial vehicle charging station when one or more unmanned aerial vehicles are within a threshold distance greater than zero from the unmanned aerial vehicle charging station; and
   a charging station body having one or more electrical contact regions electrically coupled to the power circuit, wherein the one or more electrical contact regions are electrically engageable with one or more unmanned aerial vehicles, wherein:
   the one or more detection sensors are communicatively coupled to the one or more electrical contact regions such that when the one or more detection sensors detect one or more unmanned aerial vehicles within a threshold distance greater than zero from the unmanned aerial vehicle charging station, the one or more electrical contact regions produce an inductive charge.

2. The unmanned aerial vehicle charging station of claim 1, wherein the one or more detection sensors comprise one or more cameras, one or more proximity sensors, or combinations thereof.

3. The unmanned aerial vehicle charging station of claim 1, wherein the charging station body further comprises one or more magnetic engaging portions configured to magnetically engage one or more unmanned aerial vehicles.

4. The unmanned aerial vehicle charging station of claim 1, wherein the charging station body further comprises an annular portion and the one or more electrical contact regions are positioned on the annular portion.

5. The unmanned aerial vehicle charging station of claim 1, wherein:
   the charging station body further comprises one or more mounting hooks; and
   the one or more electrical contact regions are disposed on each mounting hook.

6. The unmanned aerial vehicle charging station of claim 1, wherein the charging station body further comprises an engagement surface and one or more magnetic engaging portions, wherein the one or more electrical contact regions and the one or more magnetic engaging portions are disposed on the engagement surface.

7. The unmanned aerial vehicle charging station of claim 1, wherein the charging station body further comprises an unmanned aerial vehicle garage sized and configured to enclose one or more unmanned aerial vehicles within the unmanned aerial vehicle garage.

8. The unmanned aerial vehicle charging station of claim 1, further comprising a communications module configured to wirelessly communicate with one or more unmanned aerial vehicles.

9. An unmanned aerial vehicle charging system comprising:
   an unmanned aerial vehicle;
   an unmanned aerial vehicle charging station comprising:
   a light socket connector electrically coupled to a power circuit, wherein the light socket connector is configured to be electrically coupled to a light socket;
   a communications module configured to wirelessly communicate with the unmanned aerial vehicle;

a charging station body having one or more electrical contact regions electrically coupled to the power circuit, wherein the one or more electrical contact regions are electrically engageable with the unmanned aerial vehicle;

one or more magnetic engaging portions that are actuatable; and one or more detection sensors that are configured to detect the unmanned aerial vehicle and to provide a signal to the unmanned aerial vehicle charging station when the unmanned aerial vehicle is within a threshold distance greater than zero from the unmanned aerial vehicle charging station, wherein the one or more detection sensors are communicatively coupled to the one or more magnetic engaging portions such that when the one or more detection sensors detect one or more unmanned aerial vehicles within a threshold distance greater than zero from the unmanned aerial vehicle charging station, the one or more magnetic engaging portions produce a magnetic field.

10. The unmanned aerial vehicle charging system of claim 9, wherein the communications module wirelessly communicates with the unmanned aerial vehicle using RF, WiFi, Bluetooth, or combinations thereof.

11. The unmanned aerial vehicle charging system of claim 9, wherein the communications module is configured to wirelesssly receive a signal from the unmanned aerial vehicle, the signal communicating a status of the unmanned aerial vehicle, wherein the status indicates one or more of:
   a charge level of an electrically chargeable battery of the unmanned aerial vehicle;
   a presence of the unmanned aerial vehicle; and
   a distance between the unmanned aerial vehicle and the unmanned aerial vehicle charging station.

12. An unmanned aerial vehicle charging system comprising:
   an unmanned aerial vehicle charging station comprising a power circuit, one or more electrical contact regions, one or more detection sensors, and one or more actuatable magnetic engaging portions, wherein:
      the one or more electrical contact regions are electrically coupled to the power circuit;
      the one or more electrical contact regions are configured to provide conductive charging, inductive charging, or both to one or more unmanned aerial vehicles;
      the one or more actuatable magnetic engaging portions are configured to produce a magnetic field; and
      the one or more detection sensors are communicatively coupled to the one or more actuatable magnetic engaging portions such that when the one or more detection sensors detect one or more unmanned aerial vehicles within a threshold distance greater than zero from the unmanned aerial vehicle charging station, the one or more actuatable magnetic engaging portions produce a magnetic field.

13. The unmanned aerial vehicle charging system of claim 12, wherein the one or more detection sensors comprise one or more cameras, one or more proximity sensors, and combinations thereof.

14. The unmanned aerial vehicle charging system of claim 12, wherein the one or more electrical contact regions and the one or more actuatable magnetic engaging portions are each disposed on an engagement surface such that when one or more unmanned aerial vehicles are magnetically coupled to the one or more actuatable magnetic engaging portions the one or more unmanned aerial vehicles are electrically coupled to the one or more electrical contact regions.

* * * * *

UNITED STATES PATENT AND TRADEMARK OFFICE
CERTIFICATE OF CORRECTION

PATENT NO.         : 9,902,504 B2
APPLICATION NO.    : 14/613841
DATED              : February 27, 2018
INVENTOR(S)        : Douglas A. Moore Page 1 of 1

It is certified that error appears in the above-identified patent and that said Letters Patent is hereby corrected as shown below:

In the Claims

In Column 13, Claim 11, Line 28, before "receive", delete "wireles sly" and insert --wirelessly--, therefore.

Signed and Sealed this
Fourteenth Day of August, 2018

Andrei Iancu
*Director of the United States Patent and Trademark Office*